United States Patent [19]

Shobu

[11] Patent Number: 5,450,402
[45] Date of Patent: Sep. 12, 1995

[54] TRANSMISSION CONTROL SYSTEM IN DATA TERMINAL EQUIPMENT

[75] Inventor: Toshifumi Shobu, Atsugi, Japan

[73] Assignee: Ricoh Company, Ltd., Tokyo, Japan

[21] Appl. No.: 221,610

[22] Filed: Apr. 1, 1994

[30] Foreign Application Priority Data

Apr. 2, 1993 [JP] Japan ................................. 5-098375

[51] Int. Cl.$^6$ ..................... H04J 3/12; H04L 12/64; H04L 12/12
[52] U.S. Cl. ................... 370/68.1; 370/94.2; 370/110.1; 358/425; 379/352
[58] Field of Search ............ 370/110.1, 68.1, 94.1, 370/94.2, 60, 60.1; 379/350, 352; 358/400, 425

[56] References Cited

U.S. PATENT DOCUMENTS

| 5,142,525 | 8/1992 | Nakatsuma | 370/110.1 |
| 5,184,345 | 2/1993 | Sahni | 370/110.1 |
| 5,297,146 | 3/1994 | Ogawa | 370/110.1 |

FOREIGN PATENT DOCUMENTS 4-343548 11/1992 Japan.

*Primary Examiner*—Wellington Chin
*Attorney, Agent, or Firm*—Popham, Haik, Schnobrich & Kaufman, Ltd.

[57] ABSTRACT

Data communication is started when a first B channel is established between a source terminal and a destination terminal. Immediately before or after the start of a data transmission phase, the destination terminal is called a second time so that a second B channel may be established. Immediately before or after the data transmission phase, the use of one of the B channels is terminated. Accordingly, time required for data communication can be reduced.

6 Claims, 7 Drawing Sheets

TRANSMISSION CONTROL SYSTEM IN DATA TERMINAL EQUIPMENT

BACKGROUND OF THE INVENTION

The present invention generally relates to transmission control in data terminal equipment and, more particularly, to transmission control in a data terminal equipment unit connected to the ISDN and equipped with a multi-link communications function for carrying out data communication using a plurality of ISDN information channels.

Several types of data terminal equipment using the ISDN as a transmission line, such as group 4 facsimile machines, are proposed and actually used which equipment are equipped with a multi-link communication function for carrying out data communication using a plurality of ISDN information channels.

With the use of the multi-link communications function in performing data communication (for example, when sending color image of natural scenery), a long period of time otherwise required for the transmission is substantially reduced, and the communications cost is substantially reduced.

A problem with the conventional equipment is that, since the data communication therein is started after a desired number of information channels have been established, certain period of time is wasted in a communication session, thereby failing to exhibit an expected performance.

SUMMARY OF THE INVENTION

Accordingly, it is an object of the present invention to provide data terminal equipment capable of efficient communication.

The problem of the conventional technology is overcome and a technical advance is achieved in accordance with the principles of this invention by means of transmission control system of data terminal equipment connected to the ISDN and equipped with a multi-link communication function for performing data communication using a plurality of ISDN information channels, wherein a source terminal repeats an operation of calling a destination terminal until a desired information channel is established between the source terminal and the destination terminal, the destination terminal performs an information channel establishing operation each time it is called by the source terminal, and the source terminal and the destination terminal start a data communication using multi-link communication function when a first information channel is established therebetween and incorporate subsequently established information channels into the data communication one by one.

The aforementioned object of the present invention may also be achieved by means of a transmission control system of data terminal equipment connected to the ISDN and equipped with a multi-link communication function for performing data communication using a plurality of ISDN information channels, wherein the source terminal establishes a first information channel by calling a destination terminal so as to use the established first information channel to execute steps preceding a data transmission phase in the data communication, the source terminal repeats, once the data transmission phase is started, calling the destination terminal until desired information channels are established between the source terminal and the destination terminal and incorporates subsequently established information channels into the data communication one by one.

The aforementioned object of the present invention may also be achieved by means of a transmission control system of data terminal equipment connected to the ISDN and equipped with a multi-link communication function for performing data communication using a plurality of ISDN information channels, wherein a source terminal repeats an operation of calling another terminal until a desired information channel is established between the source terminal and the destination terminal, the destination terminal performs an information channel establishing operation each time it is called by the source terminal, the source terminal and the destination terminal start data communication using the multi-link communication function when a first information channel is established therebetween and incorporate subsequently established information channels into the data communication one by one, and all the information channels but one are released when the data transmission in the data communication is completed.

In accordance with the present invention, the time required for a communication session can be utilized efficiently because the data communication is started immediately after the first information channel is established. When the effect of the multi-link communication function using a plurality of information channels is not available, the data communication using one information channel is conducted, thereby improving the efficiency in the use of the transmission line.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENT

A detailed description will now be given of an embodiment of the present invention.

Figure 1:
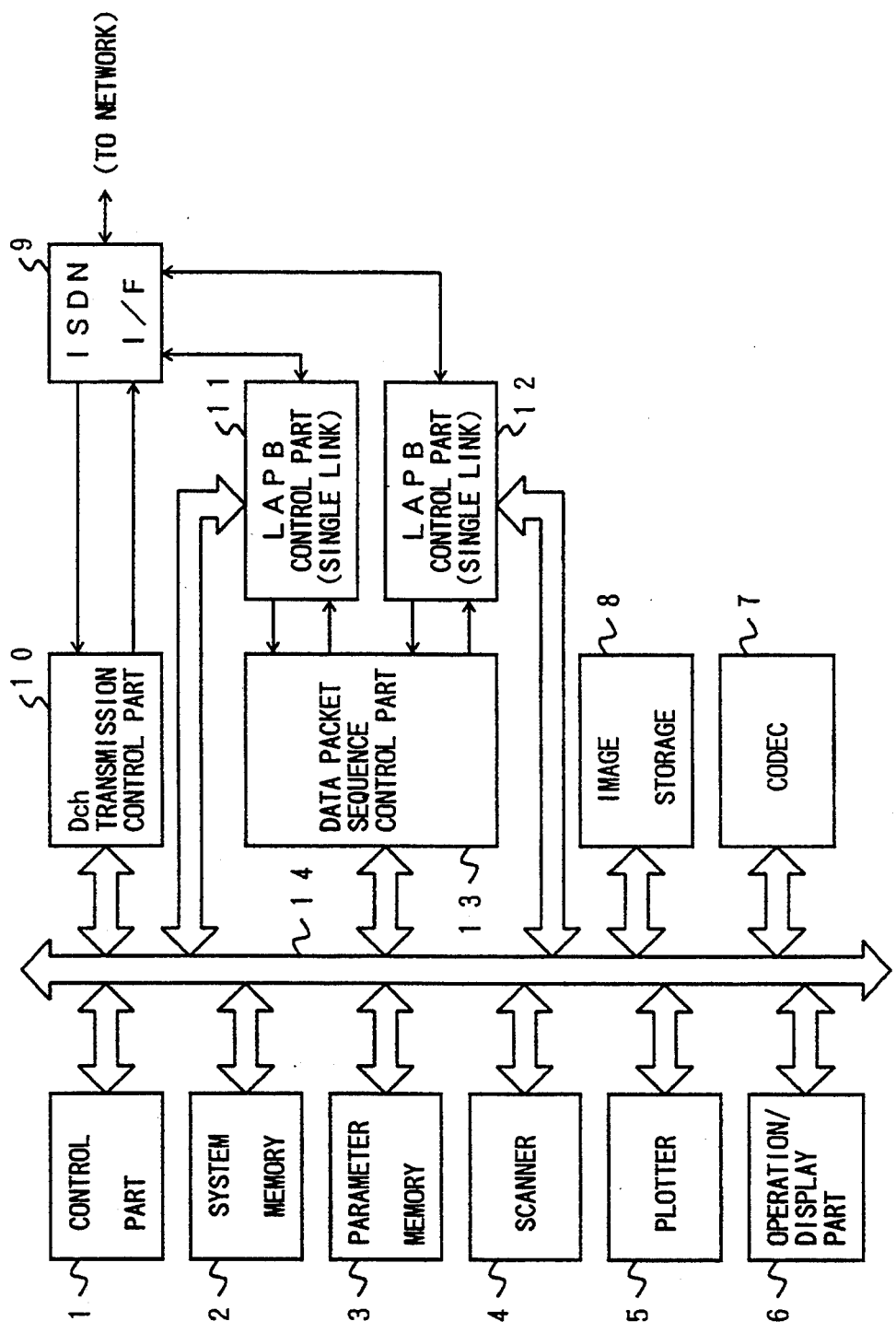
FIG. 1 is a block diagram showing a group 4 facsimile machine of an embodiment of the present invention.

FIG. 1 shows a group 4 facsimile machine of a first embodiment of the present invention;

The group 4 facsimile machine of FIG. 1 includes: a control part 1 for performing control processes whereby various parts of the group 4 facsimile machine are controlled and for performing facsimile communication processes; a system memory 2, constituting a work area of the control part 1, for storing processing program performed by the control part 1 and various kinds of data required in the execution of the processing program; and a parameter memory 3 for storing various kinds of information inherent in the group 4 facsimile machine.

The group 4 facsimile machine of FIG. 1 also includes: a scanner 4 for reading an original with a predetermined resolution; a plotter 5 for outputting the image of the original with a predetermined resolution; an operation/display part 6, consisting of various operation keys and various display parts, for operating the facsimile machine of FIG. 1; a codec 7 for encoding the picture signal and for decoding the encoded picture information into the original picture signal; an image storage unit 8 for storing a large quantity of encoded picture information; an ISDN interface circuit 9 which is equipped with the layer 1 signal processing function and with the function of integrating/separating signals on a D channel (signaling channel) and on two B channels (information channels), and which connects the group 4 facsimile machine of FIG. 1 to the ISDN; and a D channel transmission control part 10 for performing ISDN D-channel signal processes such as call setting and release processes; LAPB control parts (signaling) 11 and 12 for implementing the layer 2 function of the group 4 facsimile transmission procedure performed on the B channel; and a data packet sequence control part 13 which implements the multi-link communication function using two B channels, and which is equipped with the control function stipulated in the ISO 8208 and is capable of one-channel mode operation using one B channel and two-channel mode operation using two B channels.

In the one-channel mode, the data packet sequence control part 13 transfers data packets input from the upper layer to the LAPB control part 11 (or the LAPB control part 12) of the designated channel, and transfers the received data packet input from the LAPB control part 11 to the upper layer. In the two-channel mode, the sequence is specified in the data packets input from the upper layer, and the data packet sequence control part 13 switches between the LAPB control part 11 and the LAPB control part 12 for delivery thereto of these data packets. The data packets received from the LAPB control parts 11 and 12 are arranged in the specified sequence and transferred to the upper layer.

Irrespective of whether the one-channel mode or the two-channel mode is currently effective, the upper layer is required to exchange data with the data packet sequence control part 13 in accordance with the same procedure. Accordingly, the data exchange described above can be implemented by means of the function provided in a facsimile machine not equipped with the multi-link communication function.

The control part 1, the system memory 2, the parameter memory 3, the scanner 4, the plotter 5, the operation/display part 6, the codec 7, the image storage unit 8, the D channel transmission control part 10, the B channel transmission control parts 11 and 12, and the data packet sequence control part 13 are connected to a system bus 14. The data exchange between these components are performed primarily through the system bus 14. The data exchanges between the ISDN interface circuit 9 and the D channel transmission control part 10, between the ISDN interface circuit 9 and the LAPB control parts 11 and 12, between the LAPB control parts 11, 12 and the data packet sequence control part 13 are performed directly.

Figure 2:
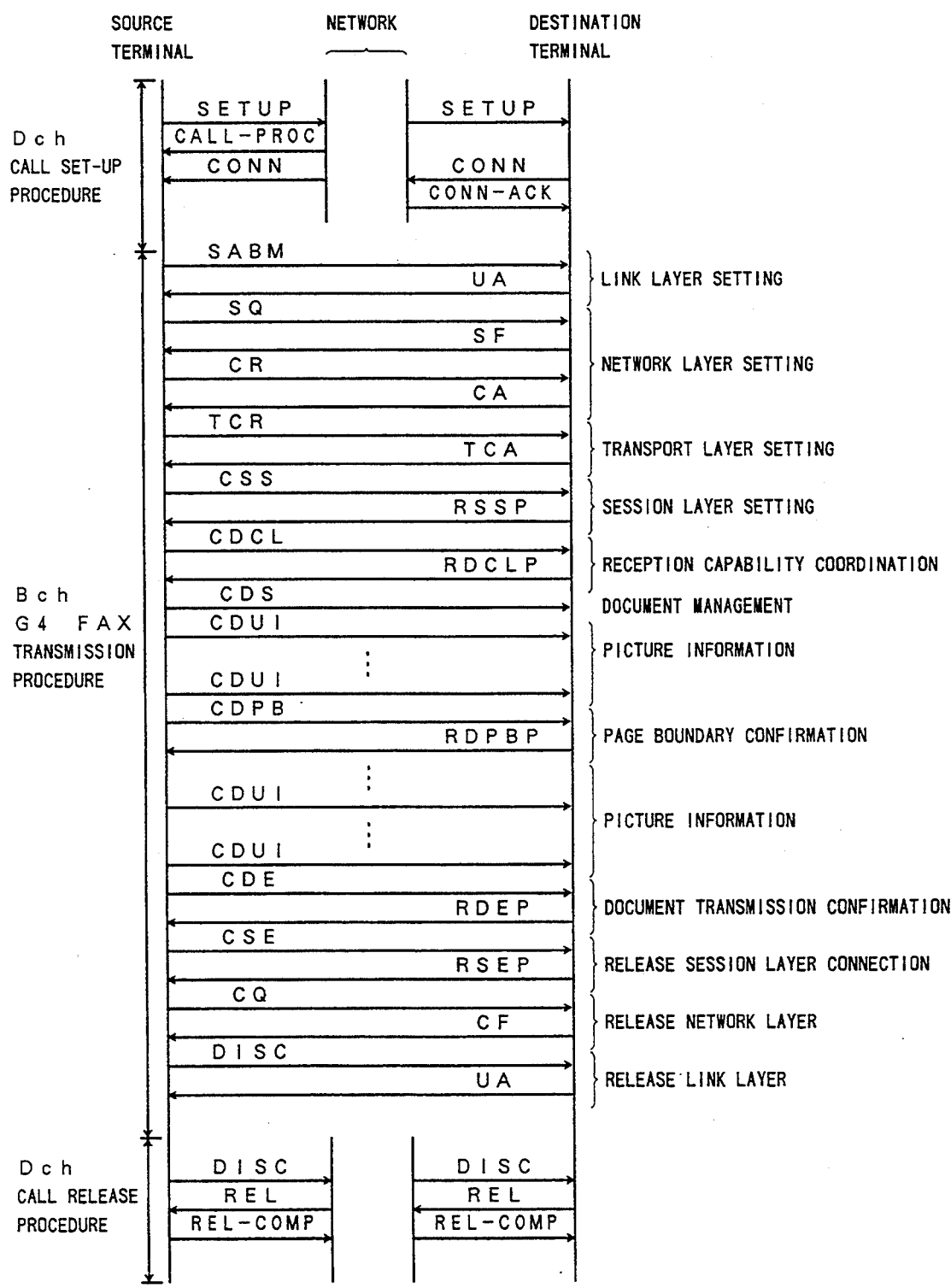
FIG. 2 is a time chart showing an example of the transmission procedure used in the group 4 facsimile machine.

FIG. 2 shows an example of basic transmission procedure executed between the group 4 facsimile machines.

In this case, the data communication is performed using one B channel.

The source terminal first sends, to the ISDN, a call set-up message SETUP for specifying a target terminal as a destination so as to request that a call be set up between the source terminal and the destination terminal. In response to this, the ISDN sends, to the source terminal, a call set-up accepted message CALL_PROC for notifying the source terminal of the call set-up status, and also sends a call set-up message SETUP to the specified destination terminal so that a call is started.

The destination terminal sends an answer message CONN when responding to the incoming call. In response to this, the ISDN sends an answer acknowledgement message CONN_ACK to the destination terminal so as to acknowledge the answer from the destination terminal. At this point, the B channel for data transmission between the source terminal and the destination terminal is established. The source terminal and the destination terminal can then execute the B channel transmission procedure.

According to the B channel transmission procedure, the source terminal sends a command SABM so as to request a setting of a link layer, and the destination terminal returns a response UA. Thereupon, the link layer is set.

In order to establish an end-to-end network layer, the source terminal sends a signal SQ, and the destination terminal sends a signal SF indicating the acceptance of the signal SQ. Thereafter, the source terminal sends a signal CR for requesting a call, and the destination terminal returns a signal CA so as to accept the call. Thereupon, a network layer is set.

The source terminal sends a signal TCR for setting a transport layer, and the destination terminal sends a signal TCA indicating the acceptance of the signal TCR. Thereupon, a transport layer is set.

The source terminal sends a session start command CSS for setting a session layer connection, and the destination terminal sends a session start positive response RSSP. Thereupon, the session layer is set.

The source terminal sends a document function list command CDCL for negotiating the transmission function used, and the destination terminal sends a document function list positive response RDCLP, whereupon the reception capability is coordinated.

When both parties are ready for picture information transmission, the source terminal sends a document start command CDS including various information items for managing document information such as document reference numbers for differentiating between the documents to be transmitted. Thereafter, the source terminal transmits a picture information constituting a document by using a plurality of document user information commands CDUI (data transmission phase), and sends, when the transmission is completed, a document end command CDE so as to indicate the end of picture information constituting a document.

Upon reception of the document end command CDE, the destination terminal sends a document end positive response RDEP indicating that the document has been successfully received.

When there are a plurality of pages included in a document, the source terminal sends a document page boundary command CDPB each time the transmission of picture information of a page is completed except in the case of the last page. Each time the document page boundary command CDPB is received, the destination terminal sends a document page boundary positive response RDPBP indicating that the picture information for a page has been successfully received.

When the picture information constituting a document has been transmitted, the source terminal sends a session end command CSE, and the destination terminal sends a session end positive response RSEP so as to release the session layer connection.

The source terminal sends a network layer signal CQ, and the destination terminal sends a signal CF in response thereto. In this way, the network layer is released. The source terminal then sends a link layer command DISC, and the destination terminal sends a response UA so that the link layer is released.

When the B channel link (call) is released, the source terminal sends a disconnect message DISC to the ISDN so as to request a release of the B channel, and the ISDN sends a release message REL to the source terminal so as to notify the source terminal of the release of the B channel.

The source terminal returns, to the ISDN, a release completion message REL_COMP for notifying the ISDN of the channel disconnection completion, whereupon the B channel between the source terminal and the ISDN is released. The ISDN also sends a release completion message REL_COMP to the destination terminal so as to release the B channel between the ISDN and the destination terminal. As a result, the B channel that had been set between the source terminal and the destination terminal is completely released.

As described above, the data transmission is performed once the B channel is set between the source terminal and the destination terminal. When the data transmission is completed, the B channel is released.

Figure 3:
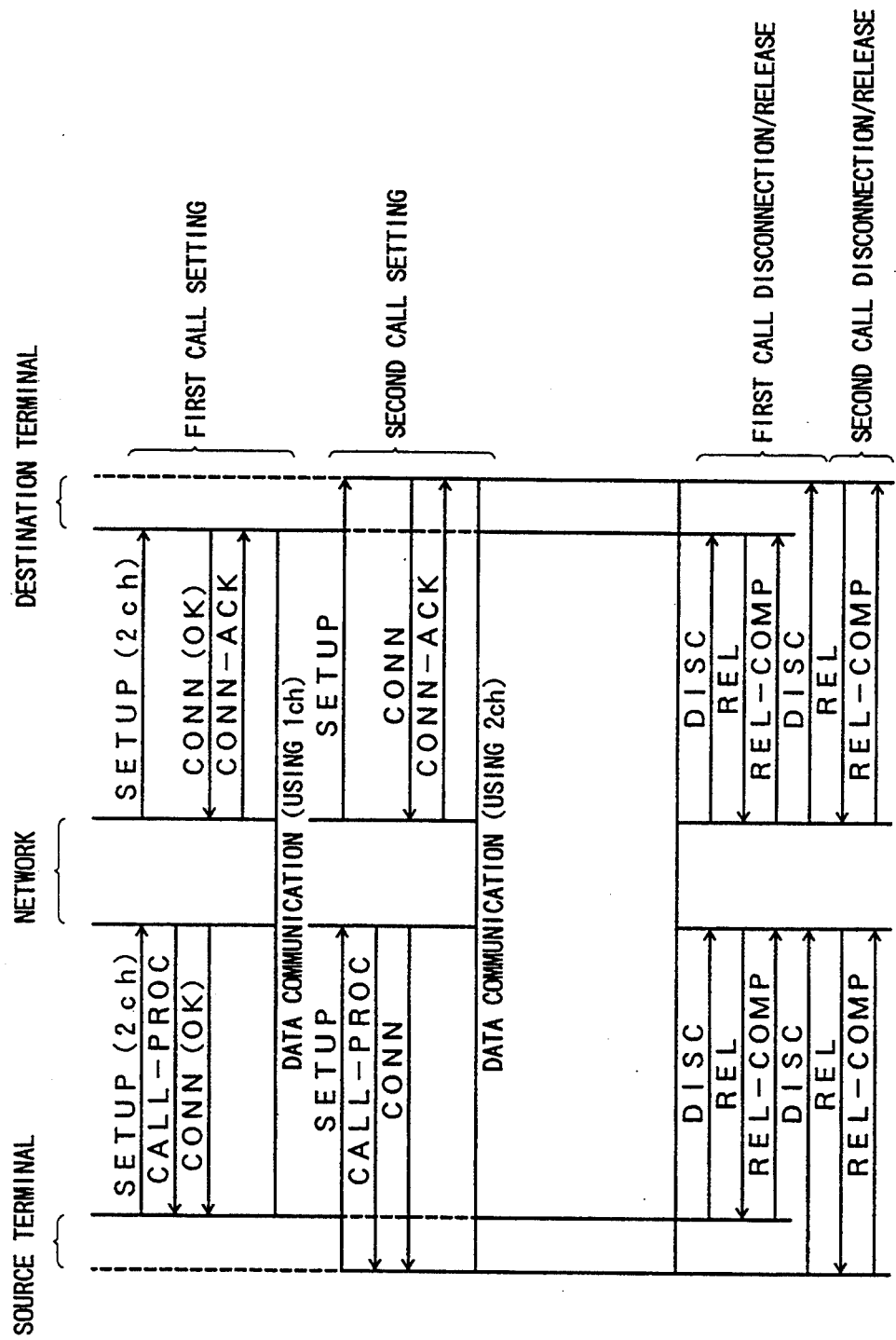
FIG. 3 is a time chart explaining a communication operation of an embodiment of the present invention.

In this embodiment, two B channels can be established between the source terminal and the destination terminal so that a multi-link communication is executed using these two B channels. FIG. 3 shows an example of transmission procedure executed in this multi-link communication.

First of all, the source terminal sends, to the network, a call set-up message SETUP (2ch) in which the data for requesting a multi-link communication using two channels is set in the user-user information element. The call set-up message SETUP (2ch) is sent from the network to the specified destination terminal.

The destination terminal which has received this call set-up message SETUP (2ch) sends, to the network, an answer message CONN (OK) in which the data indicating the acceptance of the specified multi-link communication is set in the user-user information element. Thereupon, the answer message CONN (OK) is sent from the network to the source terminal.

This results in a state wherein the source terminal and the destination terminal have specified the one-channel mode operation and have specified either the LAPB control part 11 or the LAPB control part 12 corresponding to the B channel specified by the network. In this state, the source terminal and the destination terminal activate the operation of the data packet sequence control part 13 so as to activate the LAPB control part 11 or the LAPB control part 12 corresponding to the B channel then specified by the network. Thereupon, the group 4 facsimile communication process is started. Specifically, the group 4 facsimile communication using the one B channel established first is executed.

Before the data transmission phase is started in this group 4 facsimile communication, the source terminal sends a call set-up message SETUP for calling the same destination terminal to the network. This call set-up message SETUP is sent from the network to the same destination terminal.

The destination terminal, which has received the call set-up message SETUP, sends an answer message CONN for establishing a second B channel because the call set-up message has arrived from the same source terminal as the terminal to which it is communicating in the ongoing group 4 facsimile communication. The answer message CONN is sent from the network to the source terminal.

This causes the second B channel to be established between the source terminal and the destination terminal. Thereupon, the source terminal and the destination terminal set the operation of the data packet sequence control part 13 to the two-channel mode, and activate the LAPB control part 11 or the LAPB control part 12 corresponding to the second B channel specified by the network. Thereafter, the group 4 facsimile communication using the two B channels are executed.

When the group 4 facsimile communication is terminated, the source terminal stops the transmission on the two B channels and sends a disconnect message DISC to the network so as to start a procedure for carrying out a disconnection/release operation with regard to the call using the B channel established first. When the disconnection/release operation with regard to the first call is completed, the source terminal sends a disconnect message DISC again to the network so as to carry out a disconnection/release operation with regard to the call using the B channel established second.

As has been described above, this embodiment makes more efficient use of the transmission line than the conventional technology possible because the group 4 facsimile communication can start once the first B channel is established between the source terminal and the destination terminal.

The effect of the multi-link communication using two B channels would be most manifest in the data transmission phase in which the picture information constituting a document is transmitted using a plurality of document user information commands CDUI. Hence, the transmission line would be most efficiently used and, consequently, the communications cost is reduced if the call set-up is made to proceed such that the second call set-up operation is completed immediately before or after the start of the data transmission phase, and such that the procedure for terminating the use of the first B channel is started immediately before or after the data transmission phase.

Figure 4:
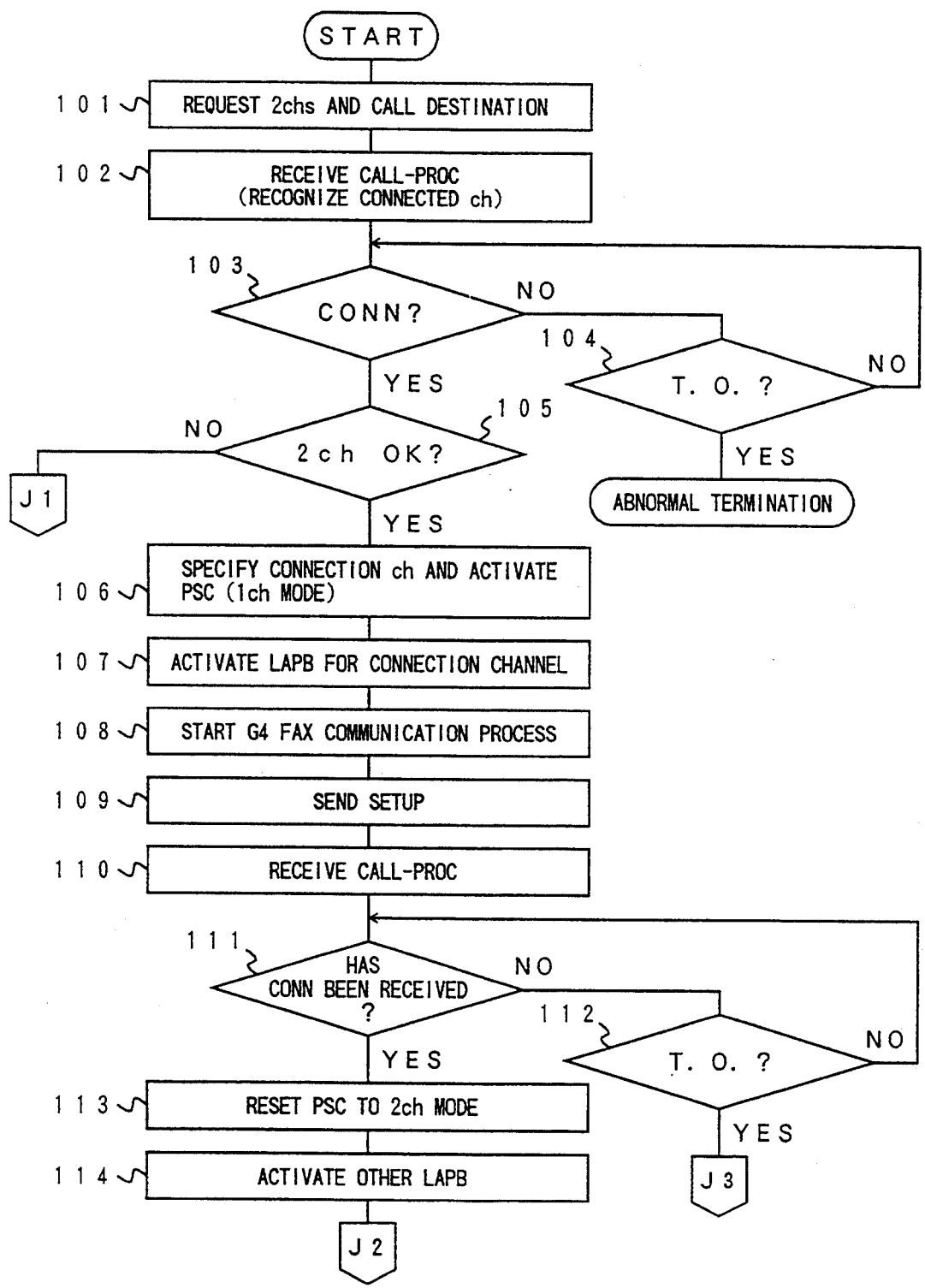
FIG. 4 is a flowchart showing a part of the processes executed by the source terminal.
Figure 5:
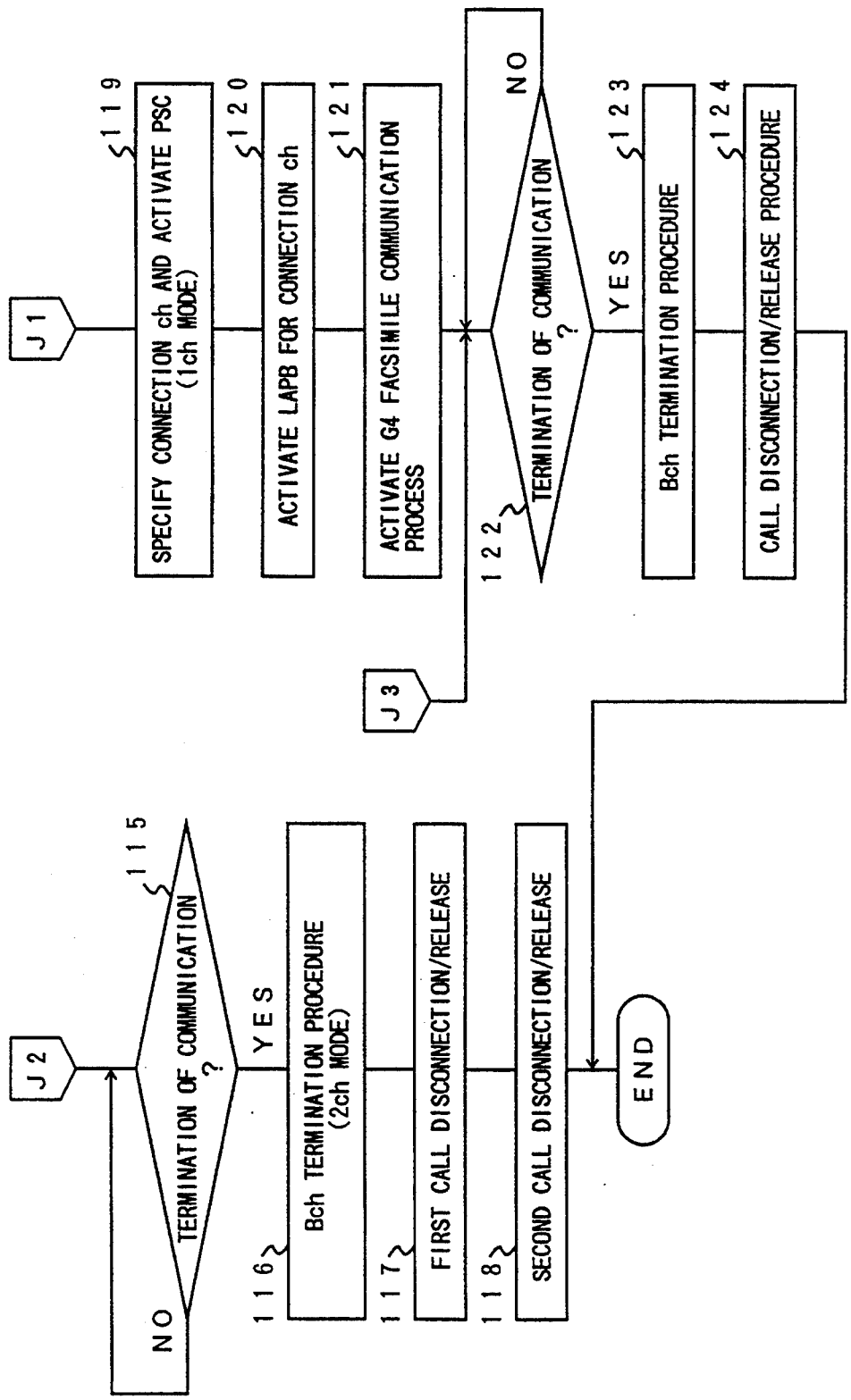
FIG. 5 is a flowchart showing another part of the processes executed by the source terminal.

FIGS. 4 and 5 show the processes executed by the source terminal.

The source terminal calls the destination terminal by sending, to the network, a call set-up message SETUP (2ch) in which the data indicating the request for the multi-link communication using two channels is set in the user-user information element (process 101). Upon reception of the call set-up accepted message CALL_PROC from the network, the source terminal recognizes the type of the B channel then specified (process 102).

The source terminal then waits until it receives an answer message CONN from the network within a predetermined period of time (the NO loop formed by the determinations 103 and 104). When the source terminal fails to receive the answer message CONN within the predetermined period of time, and the determination 104 yields an affirmative answer, the calling operation is terminated abnormally.

When the answer message CONN is received within the predetermined period of time so that the determination 103 yields an affirmative answer, an examination is made as to whether or not the data indicating "(2ch) OK" is set in the user-user information element of the received answer message CONN (determination 105).

When the determination 105 yields an affirmative answer, this results in a state wherein the source terminal has specified the one-channel mode operation, and has specified either the LAPB control part 11 or the LAPB control part 12 corresponding to the B channel specified by the network. In this state, the source terminal activates the operation of the data packet sequence control part 13 (process 106) so as to activate either the LAPB control part 11 or the LAPB control part 12 corresponding to the B channel then specified by the network (process 107).

When the source terminal is ready for the data communication using one B channel, the group 4 facsimile communication process is started (process 108). Specifically, the group 4 facsimile communication using the one B channel established first is executed.

The source terminal then sends a call set-up message SETUP for calling the same destination terminal to the network (process 109) and receives a call set-up accepted message CALL_PROC from the network so as to recognize the type of the second B channel then specified (process 110).

Thereafter, the source terminal waits until it receives an answer message CONN from the network within a predetermined period of time (the NO loop formed by the determinations 111 and 112). When the answer message CONN is received within the predetermined period of time, and the determination 111 yields an affirmative answer, it is determined that the second B channel has been established between the source terminal and the destination terminal. Accordingly, the source terminal resets the operation of the data packet sequence control part 13 to the two-channel mode operation (process 113) so as to activate the operation of either the LAPB control part 11 or the LAPB control part 12 corresponding to the second B channel then specified by the network (process 114). Thereafter, the group 4 facsimile communication using the second B channel is executed.

The source terminal waits for a notification of the end of the ongoing group 4 facsimile communication to be delivered (the NO loop formed by the determination 115). When the termination notification is delivered to the source terminal so that the determination 115 yields an affirmative answer, the B channel termination procedure including the procedure for releasing the two link layers is executed so that the use of the B channel established between the source terminal and the destination terminal is terminated (process 116). The procedure for releasing the first call is executed (process 117), and then the procedure for releasing the second call is executed (process 118) so that the communication process is terminated.

It is to be noted when the data indicating "(2ch) OK" is not set in the user-user information element of the answer message CONN received in the first call set-up operation so that the determination 105 yields a negative answer, the communication using only one channel is executed.

In a state wherein the one-channel mode operation is specified and either the LAPB control part 11 or the LAPB control part 12 corresponding to the B channel then specified by the network is specified, the source terminal activates the operation of the data packet sequence control part 13 (process 19) so as to activate either the LAPB control part 11 or the LAPB control part 12 corresponding to the B channel specified by the network (process 120).

When the source terminal is ready for the data communication using one B channel, the group 4 facsimile communication is started (process 121). Specifically, the group 4 facsimile communication using one B channel is executed.

The source terminal waits for a notification of the end of the ongoing group 4 facsimile communication (the NO loop formed by the determination 122). When the termination notification is delivered so that the determination 122 yields an affirmative result, the normal B channel termination procedure is executed so as to terminate the use of the B channel established between the source terminal and the destination terminal (process 123). The procedure for releasing the call is executed (process 124) so that the communication is terminated.

When the source terminal fails to receive the answer message CONN from the destination terminal during the second call set-up operation, that is, when a time-out has occurred, and when the determination 112 yields an affirmative result, the determination process 122 is carried out, and the process shifts to the one-channel mode communication.

Figure 6A:
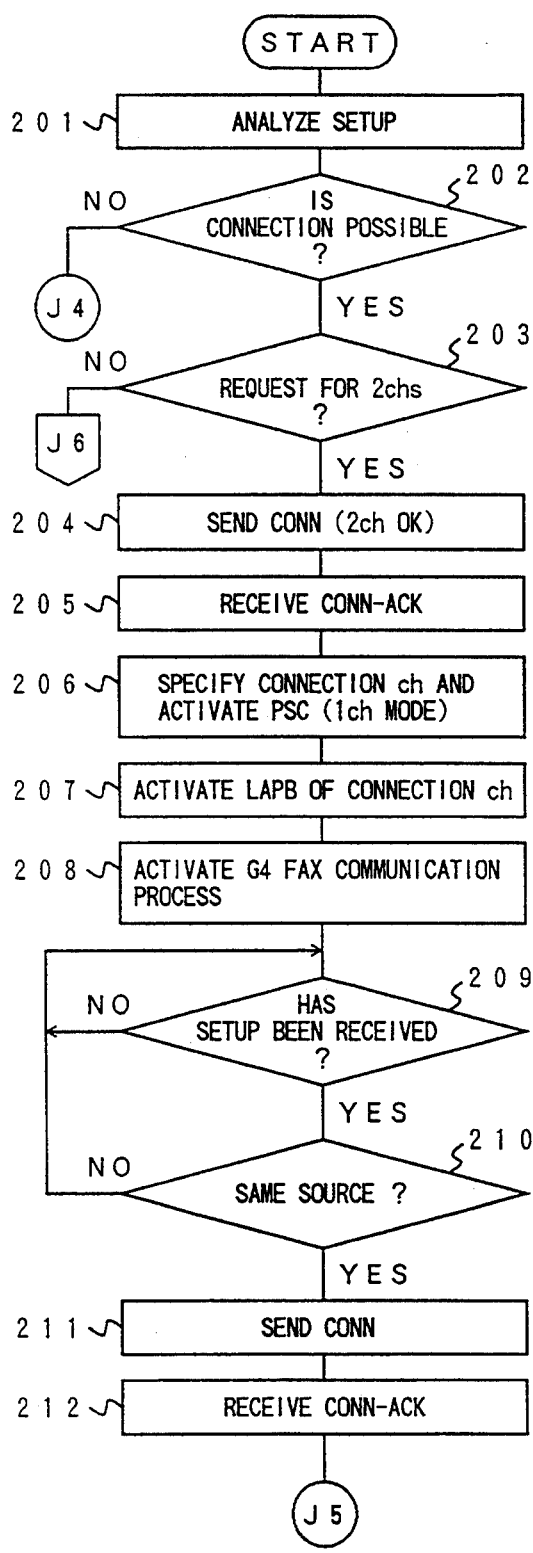
FIGS. 6A and 6B are flowcharts showing a part of the processes executed by the destination terminal.
Figure 6B:
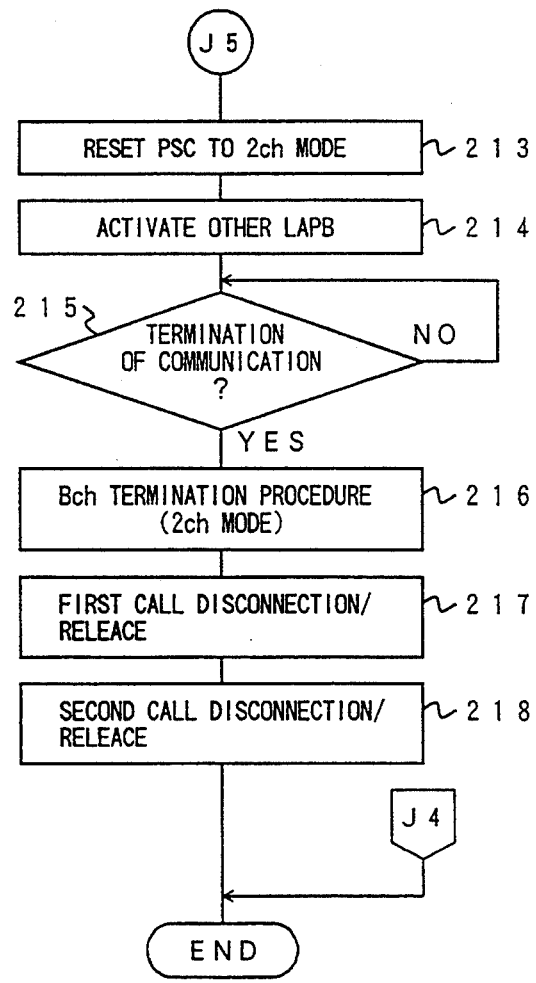
Figure 7:
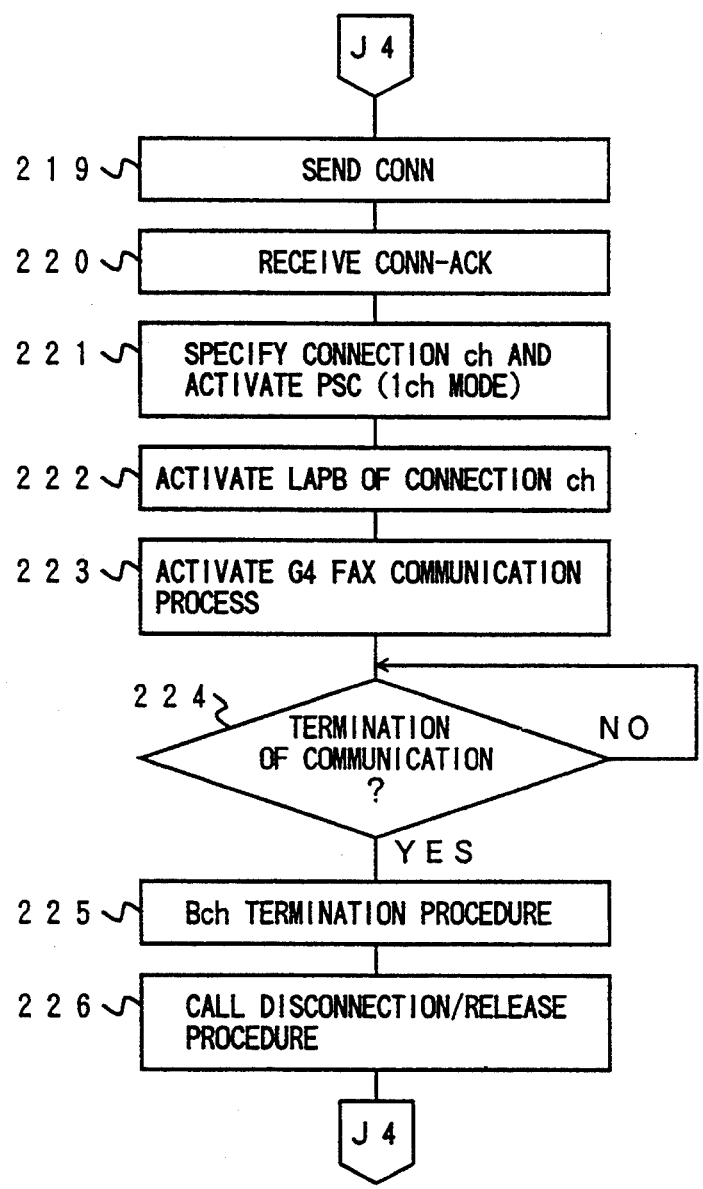
FIG. 7 is a flowchart showing another part of the processes executed by the destination terminal.

FIGS. 6A, 6B and 7 show the processes executed by the destination terminal.

When the destination terminal detects an incoming call by receiving a call set-up message SETUP, the content of the received call set-up message SETUP is analyzed (process 201), and an examination is made as to whether or not it is possible to establish a connection with the calling terminal (determination 202). When the determination 202 yields a negative answer, the incoming call is ignored.

When the determination 202 yields an affirmative result, an examination is made as to whether or not the user-user information element is included in the call set-up message SETUP and whether or not the user-user information element includes the data indicating the request for the multi-link communication using two channels (determination 203).

When the determination 203 yields an affirmative answer, an answer message CONN (OK) in which the data indicating the acceptance of the specified multi-link communication is included in the user-user information element is sent to the network (process 204). The destination terminal receives an answer acknowledgement message CONN_ACK from the network (process 205).

This results in a state wherein the destination terminal has specified the one-channel mode operation and has specified either the LAPB control part 11 or the LAPB control part 12 corresponding to the B channel then specified by the network. In this state, the destination terminal activates the operation of the data packet sequence control part 13 (process 206) so as to activate either the LAPB control part 11 or the LAPB control part 12 corresponding to the B channel specified by the network (process 207).

When the destination terminal is ready for the data communication, the group 4 facsimile communication process is started (process 208). Specifically, the group 4 facsimile communication using the B channel established first is started.

Thereafter, the destination terminal waits for a call set-up message SETUP from the same source terminal (the NO loop formed by the determinations 209 and 210). When the second call set-up message SETUP is received, and the determination 210 yields an affirmative answer, the destination terminal sends an answer message CONN (process 211) and receives an answer acknowledgement message CONN_ACK from the network.

When the second B channel is established between the source terminal and the destination terminal, the destination terminal sets the operation of the data packet sequence control part 13 to the two-channel mode operation (process 213) so as to activate either the LAPB control part 11 or the LAPB control part 12 corresponding to the second B channel specified by the network (process 214). Thereafter, the group 4 facsimile communication using the two B channels is executed.

The source terminal waits for a notification of the end of the ongoing group 4 facsimile communication to be delivered (the NO loop formed by the determination 215). When the termination notification is delivered so that the determination 215 yields an affirmative answer, the B channel termination procedure including the procedure for releasing the two link layers is executed so that the use of the B channel established between the source terminal and the destination terminal is terminated (process 216). The procedure for releasing the first call is executed (process 217), and then the procedure for releasing the second call is executed (process 218) so that the communication process is terminated.

When the user-user information element including the data indicating the request for the multi-link communication using two channels is not included in the call set-up message SETUP, and when the determination 203 yields a negative answer, the normal communication is executed.

That is, the destination terminal sends an answer message CONN (OK) to the network (process 219) and receives an answer acknowledgement message CONN_ACK from the network (process 220). This results in a state wherein the destination terminal has specified the one-channel mode operation, and has specified either the LAPB control part 11 or the LAPB control part 12 corresponding to the B channel then specified by the network. In this state, the destination terminal activates the operation of the data packet sequence control part 13 (process 221) and activates either the LAPB control part 11 or the LAPB control part 12 corresponding to the B channel then specified by the network (process 222).

When the destination terminal is ready for the data communication, the group 4 facsimile communication is started (process 223). Specifically, the group 4 facsimile communication using the B channel first established is started.

The destination terminal waits for a notification of the end of the group 4 facsimile communication to be delivered (the NO loop formed by the determination 224). When the termination notification is delivered so that the determination 224 yields an affirmative answer, the normal B channel termination procedure is executed (process 225). The procedure for releasing the call is executed (process 226) so that the communication process is terminated.

While the above description of the embodiment assumes that the present invention is applied to the group 4 facsimile machine, the present invention may also be applied to other data terminal equipment equipped with the multi-link communication function. Also, while the above described embodiment uses a machine connected to the ISDN basic interface, the present invention may also be applied to the machine capable of using more than two B channels.

The present invention is not limited to the above described embodiment, and variations and modifications may be made without departing from the scope of the present invention.

What is claimed is:

1. A transmission control system of data terminal equipment connected to an ISDN and equipped with a multi-link communication function for performing data communication using a plurality of ISDN information channels, wherein:

a source terminal repeats an operation of calling a destination terminal until a desired number of information channels is established between the source terminal and destination terminal, the destination terminal performs an information channel establishing operation each time it is called by the source terminal, and the source terminal and the destination terminal start a data communication using the multi-link communication function when a first information channel of the desired number of information channels is established therebetween and incorporate subsequently established information channels into the data communication one by one.

2. The system of claim 1, wherein:

the transmission control system is applied to a facsimile machine having a data packet sequence control part equipped with a control function stipulated in ISO8208.

3. A transmission control system of data terminal equipment connected to an ISDN and equipped with a multi-link communication function for performing data communication using a plurality of ISDN information channels, wherein:

the source terminal establishes a first information channel of a desired number of information channels by calling a destination terminal party so as to use the established first information channel to execute steps preceding a data transmission phase in the data communication, and the source terminal repeats, once the data transmission phase is started, calling the destination terminal until the desired number of information channels is established between the source terminal and the destination terminal, and incorporates subsequently established information channels into the data communication one by one.

4. The system of claim 3, wherein:

the transmission control system is applied to a facsimile machine having a data packet sequence control part equipped with a control function stipulated in ISO8208.

5. A transmission control system of data terminal equipment connected to an ISDN and equipped with a multi-link communication function for performing data communication using a plurality of ISDN information channels, wherein:

a source terminal repeats an operation of calling another terminal until a desired number of information channels is established between the source terminal and the destination terminal, the destination terminal performs an information channel establishing operation each time it is called by the source terminal, the source terminal and the destination terminal start data communication using the multi-link communication function when a first information channel of the desired number of information channels is established therebetween and incorporate subsequently established information channels into the data communication one by one, and all the information channels but one are released when the data transmission in the data communication is completed.

6. The system of claim 5, wherein:

the transmission control system is applied to a facsimile machine having a data packet sequence control part equipped with a control function stipulated in ISO8208.

* * * * *